United States Patent [19]
James

[11] 3,711,039
[45] Jan. 16, 1973

[54] PNEUMATIC LEADING EDGE FLAP FOR AN AIRCRAFT WING

[75] Inventor: Varnell L. James, Enumclaw, Wash. 98022

[73] Assignee: The Boeing Company, Seattle, Wash.

[22] Filed: Oct. 26, 1970

[21] Appl. No.: 84,000

[52] U.S. Cl. ................................................244/44
[51] Int. Cl. ...............................................B64c 3/46
[58] Field of Search..244/44, 43, 42 R, 42 D, 42 CA, 244/46

[56] References Cited

UNITED STATES PATENTS

| | | | |
|---|---|---|---|
| 2,378,528 | 6/1945 | Arsandaux | 244/44 |
| 2,912,190 | 11/1959 | MacDonough | 244/44 |
| 3,556,439 | 1/1971 | Antry | 244/42 R |
| 2,120,250 | 6/1938 | Houston | 244/44 |
| 2,384,933 | 9/1945 | Lee | 244/44 |
| 2,504,684 | 4/1950 | Harper | 244/40 R |
| 2,763,448 | 9/1956 | Davie, Jr. | 244/44 |
| 2,851,229 | 9/1958 | Clark | 244/44 |

FOREIGN PATENTS OR APPLICATIONS 1,003,096   3/1952   France..............................244/42 R Primary Examiner—Milton Buchler
Assistant Examiner—Carl A. Rutledge
Attorney—Glenn Orlob, Kenneth W. Thomas and Theron H. Nichols

[57] ABSTRACT

This invention comprises an expandable pneumatic leading edge flap for an aircraft wing that increases the $C_L$ (coefficient of lift) thereof. A thin flexible titanium membrane extends from the stagnation point of the leading edge flap rearwardly along the back surface of the flap to a roller assembly housed within the wing leading edge portion, and an inflatable bag housed within a suitable recess in the lower leading edge portion of the airfoil and enclosed by the leading edge flap when retracted. During high speed flight the bag is deflated and the membrane is stretched taunt so as to define a clean aerodynamic leading edge. When increased lift is desired, the bag is inflated causing the membrane to be unrolled to form an expanded leading edge flap for the wing.

6 Claims, 4 Drawing Figures

INVENTOR.
VARNELL L. JAMES
BY
Theron H. Nichols
AGENT

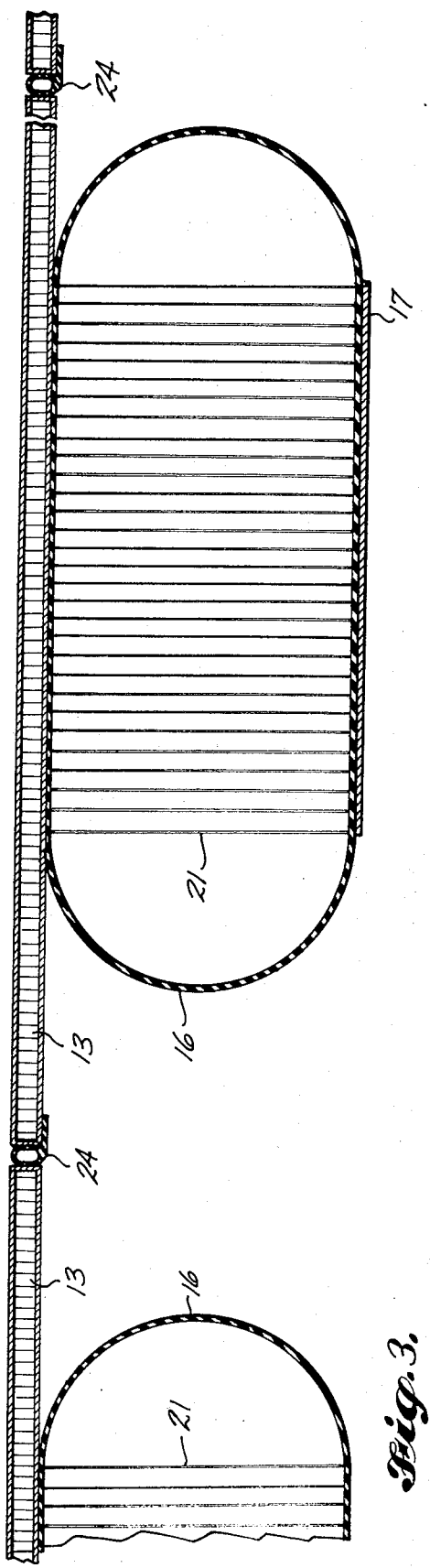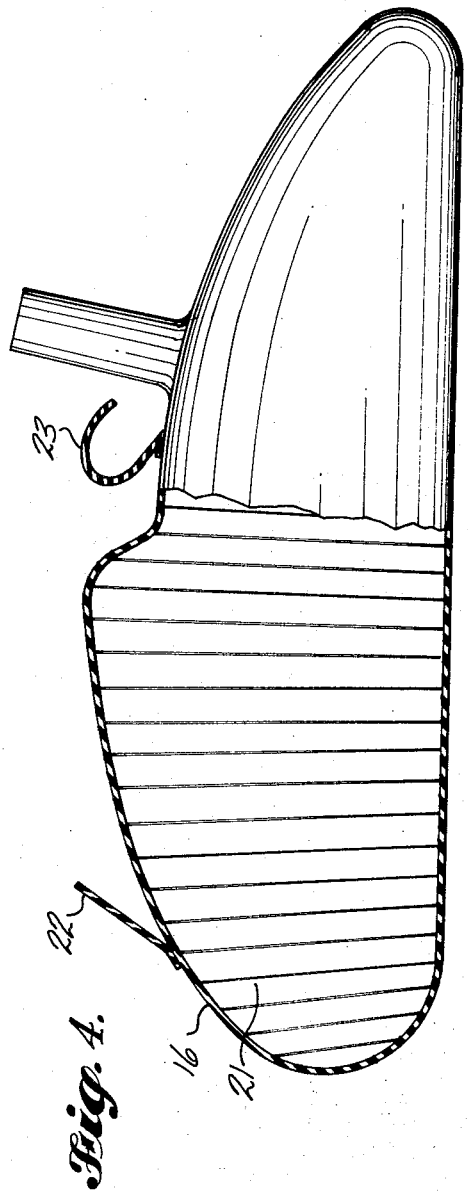
Fig. 3.
Fig. 4.
INVENTOR.
VARNELL L. JAMES

PNEUMATIC LEADING EDGE FLAP FOR AN AIRCRAFT WING

SUMMARY OF INVENTION

This invention is a pneumatically extendable leading edge flat that increases the $C_L$ of an aircraft wing requiring a minimum of space, weight, and mechanism. The flap comprises a structurally rigid panel portion that is pivotable from the wing leading edge portion into two positions by two separately inflatable bag actuating means, one extended position for takeoff and a further extended position for landings. The under surface of the rigid leading edge flap portion has a thin flexible titanium sheet (or any other suitable material) connected thereto and this sheet extends rearwardly back to a roller inside the wing leading edge portion. Between the sheet and rigid leading edge portion is a pneumatic bag. In deflated condition the flexible titanium sheet is rolled on the roller in the wing for being pulled taut and for pulling the rigid flap portion up against the wing and forming the lower wing surface portion of the wing leading edge portion and enclosing the deflated bag in the wing leading edge portion which likewise is stored in a suitable recess in the wing leading edge portion. For takeoffs the pneumatic bag is inflated and the titanium sheet is unrolled, thus causing the leading edge flap to extend to the takeoff position. For landings a second bag is inflated to swing the leading edge flap slightly further forward to a further and maximum forward position with unrolling of the reel providing a maximum $C_L$ for the wing as a whole for landings. The rigid flap portion has an arcuate pose element pivotally connected to the outer end thereof for forming an aerodynamic curve on the leading edge of the flap at the stagnation point.

Accordingly, a principal object of this invention is to provide an efficient leading edge flap with pneumatic extension for an aircraft wing.

Another object of this invention is to provide a wing flap which has a flexible membrane enclosing a pneumatic bag on the undersurface of the leading edge flap.

Another object of this invention is to provide a leading edge flap with two separately expandable pneumatic bags attached thereto for extending the flap from a high speed retracted position to a high lift extended position for takeoffs by the inflation of one bag and a further extended position for landings by the inflation of both bags.

A still further object of this invention is to provide two expandable pneumatic bags on a leading edge flap wherein tension fibers are positioned internally of the bags to maintain the proper aerodynamic shape thereof when forming a leading edge flap on a leading edge portion of a wing wherein either one or two bags may be inflated for flap extension.

It has been found that the aforementioned objects can be accomplished to a considerable extent by the disclosed expandable pneumatic leading edge flap.

Other objects and various advantages of the disclosed pneumatic leading edge of an aircraft wing will be apparent from the following detailed description together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example not by way of limitation, two forms of the invention wherein like reference numerals designate corresponding parts in the several views in which:

FIG. 3 is similar to a sectional view taken at 3—3 on FIG. 2 but of a modified bag; and FIG. 4 is a side view of a single pneumatic bag utilized in the invention, with parts in section for clarity of disclosure.

DESCRIPTION OF THE PREFERRED EMBODIMENT

Figure 1:
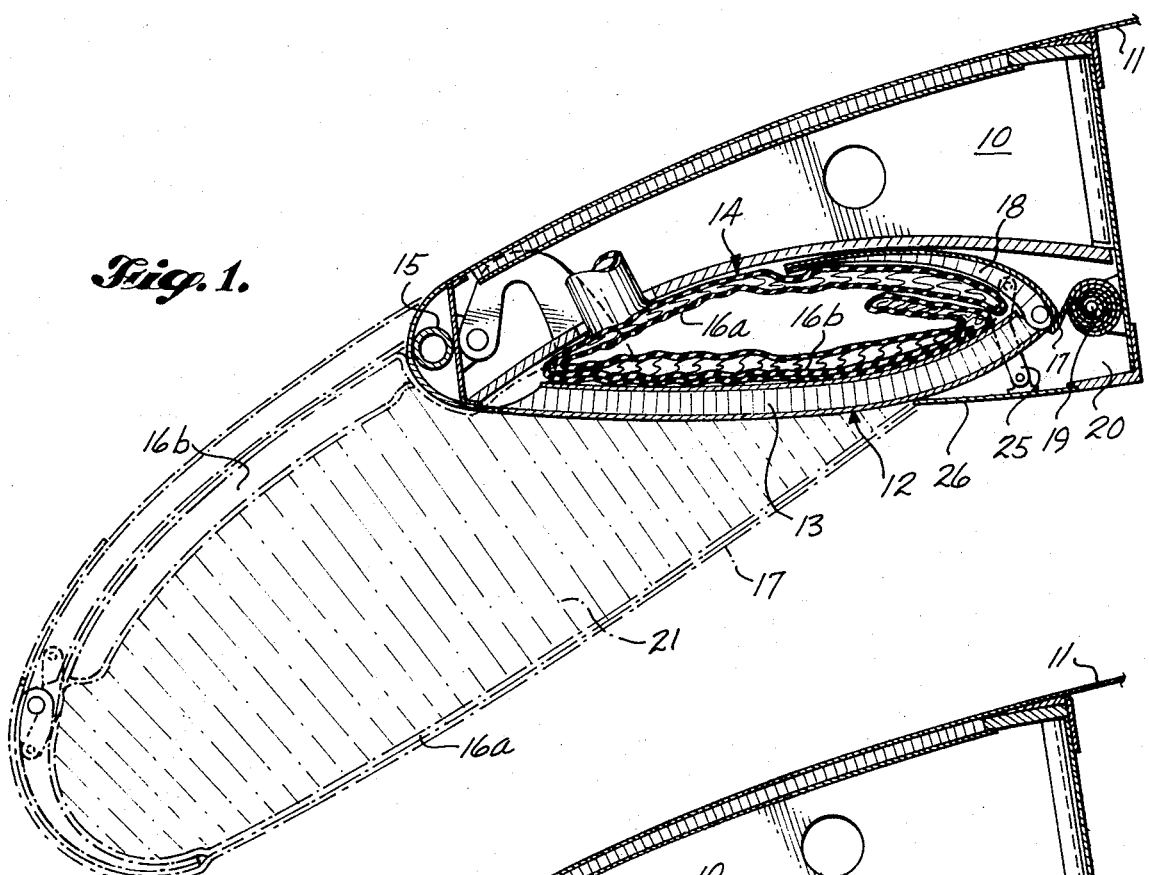
FIG. 1 is a schematic sectional view of a leading edge portion of the wing with the inventive leading edge flap shown in retracted position in solid lines and illustrated in extended landing position in broken lines.

FIG. 1 illustrates schematically a cross sectional view of a leading edge portion 10 of a wing 11 having a leading edge flap 12. The leading edge flap 12 comprises a rigid leading edge portion 13 and an inflatable portion 14. The rigid leading edge portion 13 is pivotally mounted to the wing leading edge portion 10 with a pivot 15. In FIG. 1, the leading edge flap 12 is illustrated in landing position in broken lines and is illustrated in retracted position in solid lines. The inflatable portion 14 comprises pneumatic inflatable bags 16a and 16b which are illustrated with both in deflated condition in solid lines in FIG. 1, and a flexible membrane 17 which is illustrated connected to an arcuate pose portion 18 of the rigid leading edge flap portion 12 and coiled at its other end on a suitable reel 19 in a recess 20 in the wing leading edge portion 10. The two bags 16a and 16b cause the leading edge flap 12 to assume and maintain either of the two positions, slender bag 16b being mounted "piggy back" style on larger bag 16a. Each bag has its own air supply (not shown), whereby inflation of large bag 16a moves the flap 12 to the takeoff position of FIG. 2 and inflation of the second bag 16b in addition to the first bag 16a actuates the leading edge flap 12 to landing position illustrated by the dotted lines in FIG. 1.

Reel 19 may have a lock for stopping it at each of the two outer positions, the first position for takeoff and the second, more extended position for landing. This reel 19 may be powered with air, electricity, or hydraulic fluid. Membrane 17 may be formed of any suitable nonstretchable and flexible material, such as but not limited to titanium.

For landings, the leading edge flap is extended to a maximum amount for providing the greatest chord as illustrated in broken lines in FIG. 1.

To deflate the bags and retract the leading edge flap to the final stored position, a suction may be pulled on the bags.

Link 25 and cowling 26 are secured at the ends of the leading edge flap to overlap the titanium sheet 17. For movement clearance of link 25, a slit may be formed in the end of the sheet 17 adjacent to its connection to the rigid leading edge portion 13.

Figure 2:
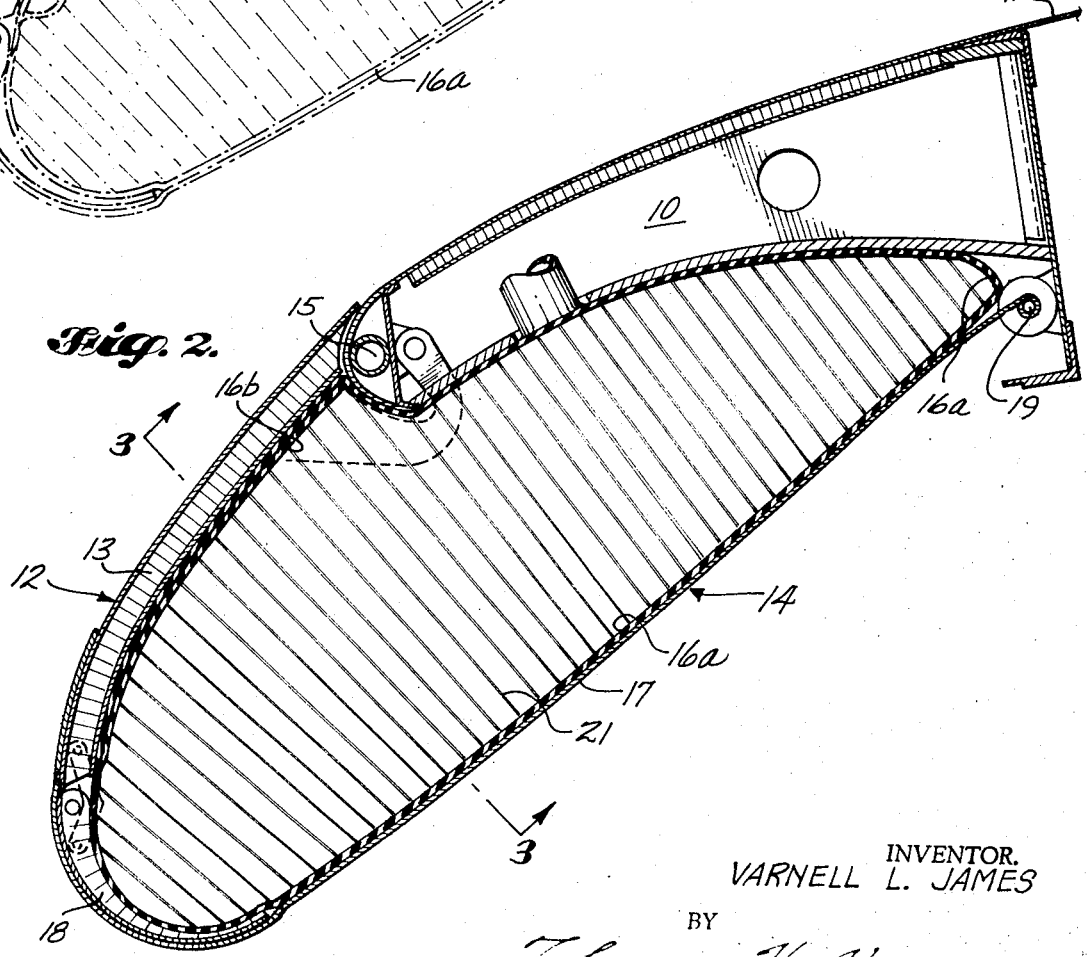
FIG. 2 is a view similar to FIG. 1 with the leading edge flap illustrated in extended high lift position for takeoffs.

FIG. 2 illustrates the leading edge flap 12 actuated to the takeoff position wherein the rigid leading edge portion 13 is pivoted about its pivot 15 to extended position due to action of only the pneumatic bag 16a being inflated. Likewise, upon inflation of the bag the flexible membrane 17 has been unrolled from the wing leading edge portion 10 to enclose the lower periphery of the bag 16a. The arcuate pose portion 18 of the rigid leading edge portion 12 of the flap is shown extended by the bag to form the aerodynamic shape of the flap, particularly at the stagnation point of the flap. As shown in the sectional view of the extended pneumatically inflatable leading edge flap 12 of FIG. 2, drop or tension fibers 21 are illustrated internally of the pneumatic bags 16a and 16b to maintain the proper aerodynamic shape of the bags in conjunction with the flexible membrane 14 around the lower and aft periphery of bag 16a.

FIG. 3, a section at 3—3 on FIG. 2, illustrates the plurality of inflatable bags 16a only usually utilized to actuate the rigid leading edge flap portion 13. Likewise is illustrated the tension fibers 21 inside the bags for maintaining the proper aerodynamic shape thereof.

Seals 24 are positioned between sections of the rigid leading edge portions 13 and each seal 24 is connected to only one portion 13.

FIG. 4 illustrates the bag 16 per se, with portions shown in section for clarity of disclosure, likewise illustrating the tension fibers 21.

Bag 16 and tension of filament fibers 21 are formed of any flexible material that can be woven into a drop thread type of pressure bag, such as but not limited to a nylon or stainless steel bag, as "Air Matt" manufactured by Goodyear. The material nylon is utilized if the operating temperatures do not exceed 120°F, and stainless steel is used for operating temperatures over 120°F and pressures over 10 p.s.i.

Tabs 22 and 23 on the bag may be connected to flap structure with flat headed screws.

Accordingly, it will be seen that the present pneumatic leading edge for an aircraft wing operates in a manner which meets each of the objects set forth hereinbefore.

While only two embodiments of the invention have been disclosed, it will be evident that various modifications are possible in the arrangement and construction of the disclosed pneumatic leading edge for an aircraft wing without departing from the scope of the invention. And, it is accordingly desired to comprehend within the purview of this invention, such modifications as may be considered to fall within the scope of the appended claims.

I claim:

1. A variable lift aircraft wing comprising: a leading edge portion for the aircraft wing; flap means comprising a structurally rigid panel portion movably carried by said wing leading edge portion; actuating means comprising a pneumatically deformable unitary bag having internal members for maintaining the shape of the inflated form to a predetermined contour; said actuating means interconnecting the flap with the undersurface of the leading edge portion of the wing for extending the flap to an operative forward and downward extended position for changing said aircraft wing to a high lift wing for landings and takeoffs; and said actuating means being collapsible to a greatly reduced volume for retraction into said wing leading edge portion for converting said aircraft wing into a low drag, high speed wing.

2. A variable lift aircraft wing as recited in claim 1, wherein: said flap structurally rigid panel portion has first and second ends; said first end of the panel portion being pivotally connected to said wing leading edge portion; and arcuate nose portion being pivotally connected to said second end of said flap panel portion; and said arcuate nose portion also being connected to said inflatable actuating means whereby said arcuate nose portion is pivoted forwardly relative to said flap panel portion by said inflatable actuating means for increasing the chord and camber of said wing, and said arcuate nose portion is pivoted in the opposite direction rearwardly relative to said structurally rigid panel portion by said inflatable actuating means for decreasing the chord and camber of said wing.

3. A variable lift aircraft wing as recited in claim 1, wherein: said actuating means when fully inflated forms an external shape that conforms to the undersurface of the flap panel portion in its extended position and encloses the area between the leading edge portion of the flap panel and the undersurface of the leading edge portion of the wing so as to form an enclosed convex aerodynamic leading edge flap for the wing.

4. A variable lift aircraft wing as recited in claim 3, wherein: said actuating means comprises two inflatable bags secured between said wing leading edge portion and said flap panel portion; the second of said bags being positioned on top of the first bag and in abutment relation with the undersurface of the flap panel portion such that when both bags are inflated, the movably mounted flap panel portion is extendable to a greater amount for increasing the chord and camber of the aircraft wing than when only one of said bags is inflated.

5. A variable lift aircraft wing as recited in claim 1, further including: a flexible sheet interconnecting the leading edge of the flap with the undersurface of the leading edge portion of the wing for enclosing the undersurface of the pneumatically deformable bag when in the inflated form.

6. A variable lift aircraft wing as recited in claim 5, wherein: one end of said flexible sheet is fixedly connected to the leading edge of the flap and the other end of the sheet is rolled on a reel attached to the undersurface of the leading edge portion of the wing whereby the sheet is reeled out as the actuating means is inflated and reeled in when the actuating means is deflated.

* * * * *